Dec. 3, 1968  W. A. FELIKS ET AL  3,413,960
EQUIPMENT COMPRISING A PROCESSING VESSEL OR A STEAM
GENERATOR HAVING A SUPPORTING STRUCTURE WHICH
ALLOWS FOR THE THERMAL VARIATION IN LENGTH
OF CONNECTING PIPE LINES
Filed Aug. 8, 1966  4 Sheets-Sheet 1

INVENTORS
WILHELMUS A. FELIKS
HENRI H. WEEVERS

BY *Stevens, Davis, Miller & Mosher*
ATTORNEYS

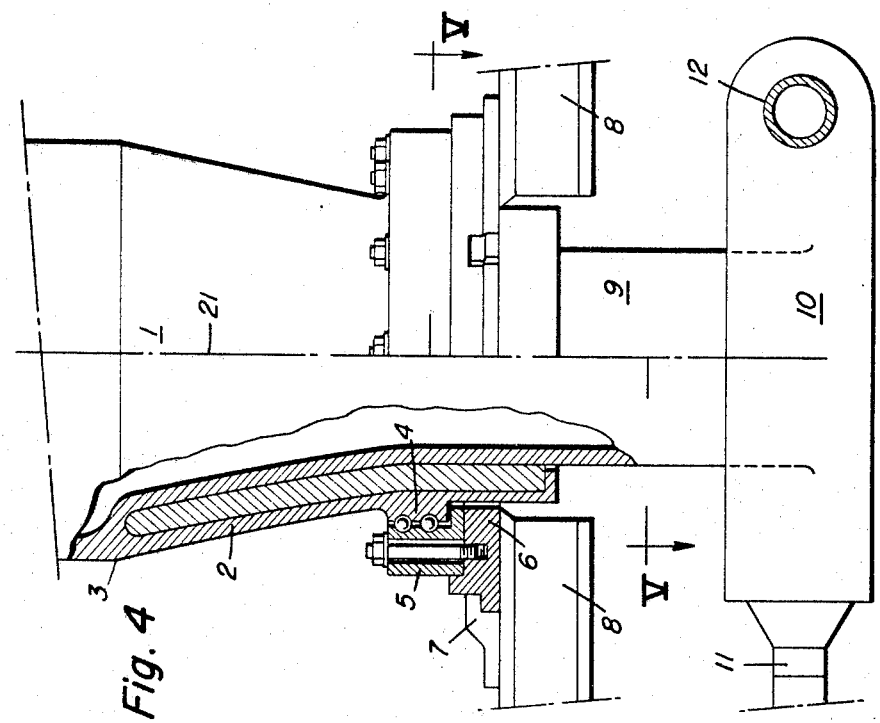
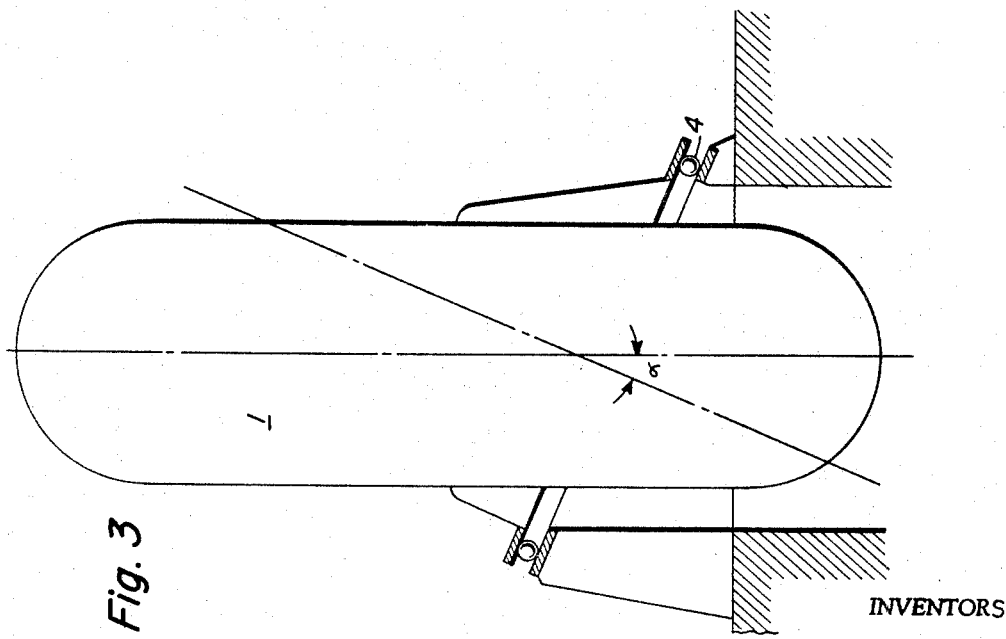

Dec. 3, 1968  W. A. FELIKS ET AL  3,413,960
EQUIPMENT COMPRISING A PROCESSING VESSEL OR A STEAM
GENERATOR HAVING A SUPPORTING STRUCTURE WHICH
ALLOWS FOR THE THERMAL VARIATION IN LENGTH
OF CONNECTING PIPE LINES
Filed Aug. 8, 1966  4 Sheets-Sheet 3
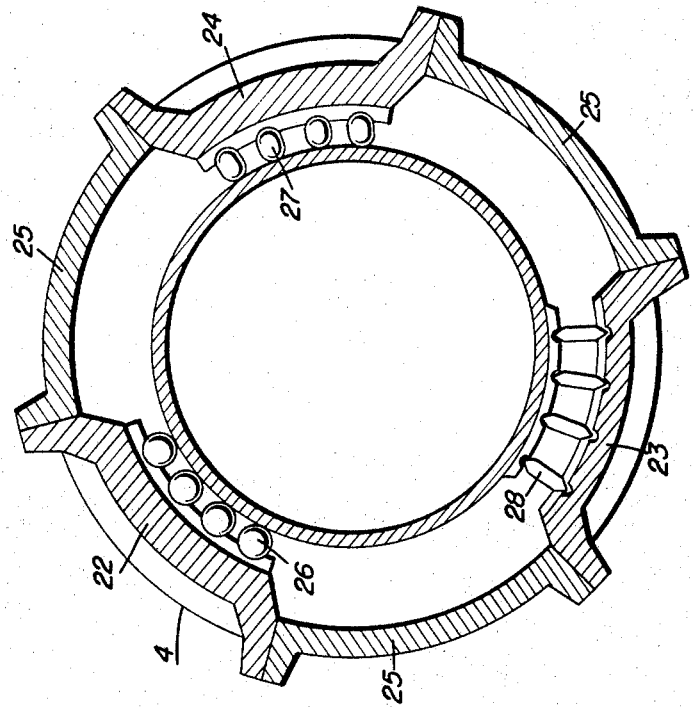
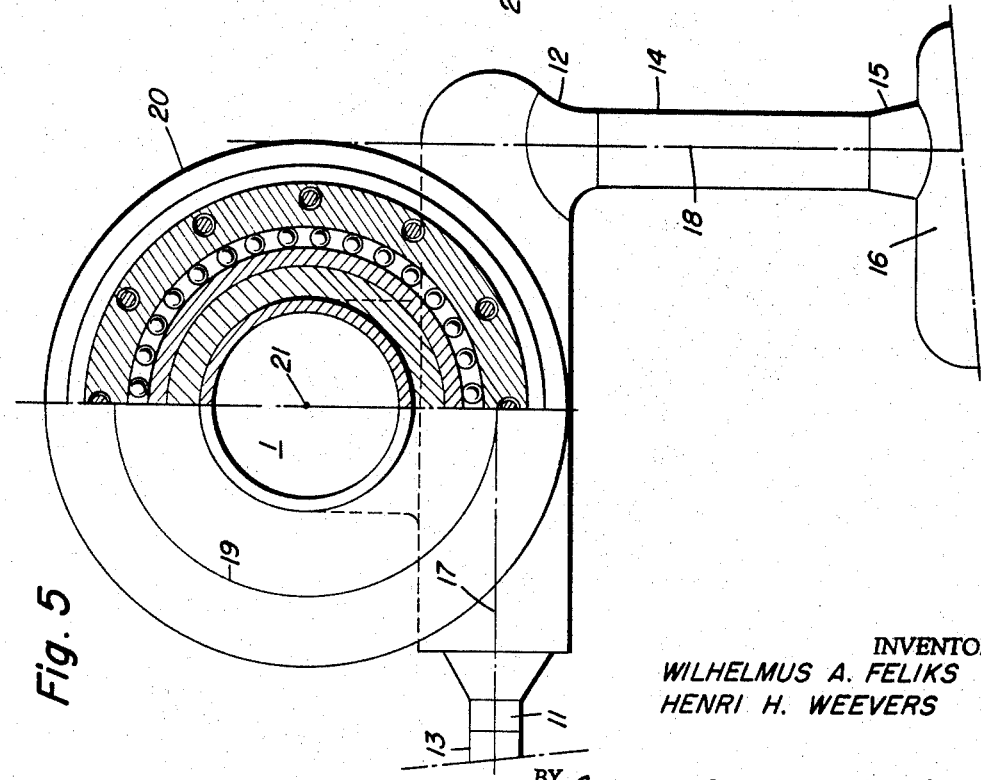
INVENTORS
WILHELMUS A. FELIKS
HENRI H. WEEVERS
BY *Stevens, Davis, Miller & Mosher*
ATTORNEYS

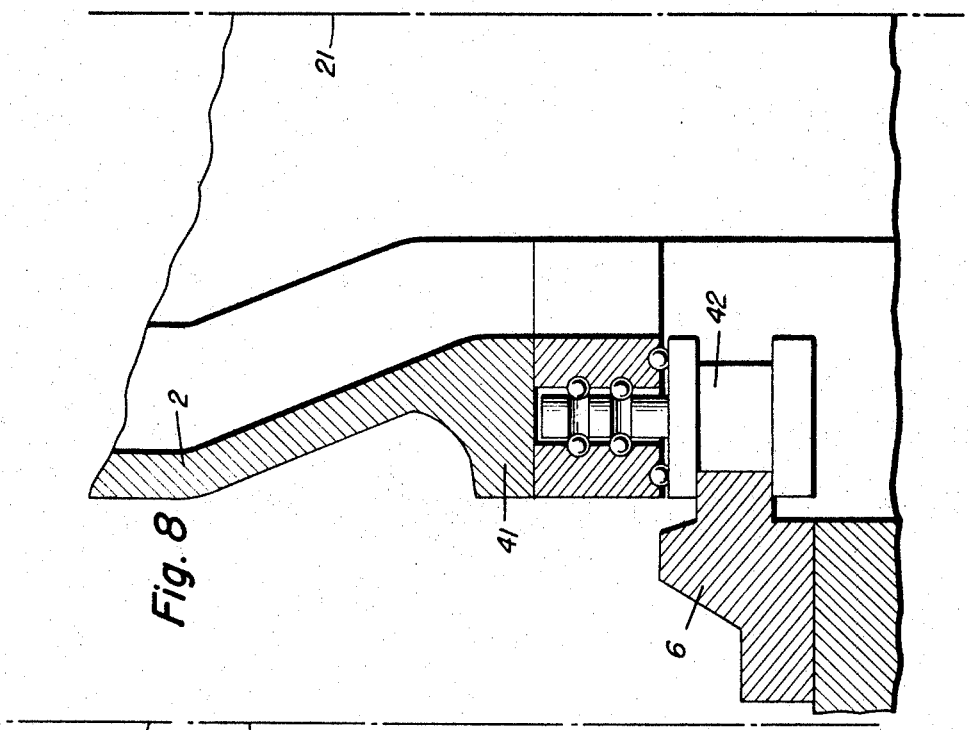
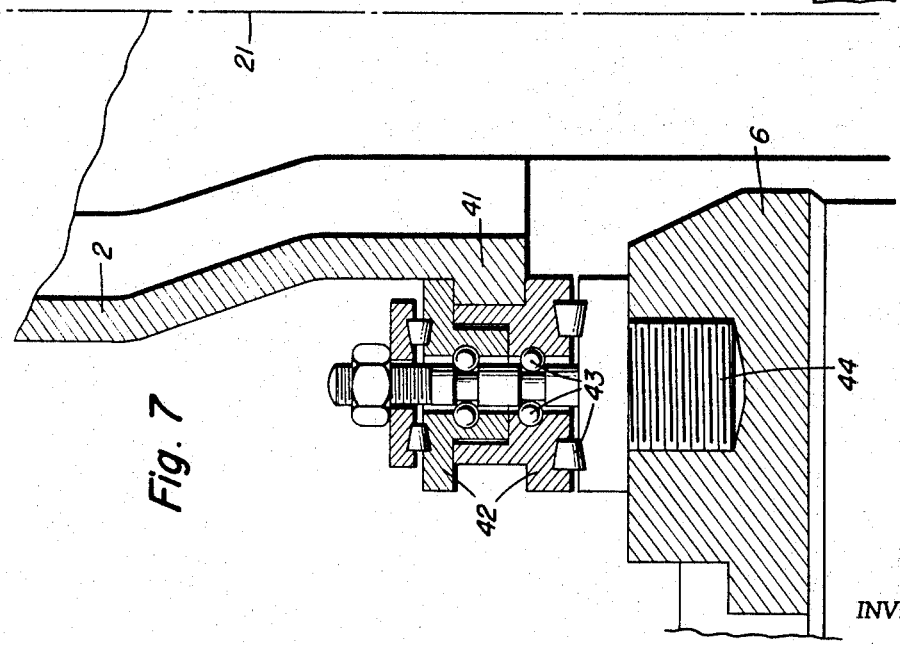

United States Patent Office 3,413,960
Patented Dec. 3, 1968

3,413,960
EQUIPMENT COMPRISING A PROCESSING VESSEL OR A STEAM GENERATOR HAVING A SUPPORTING STRUCTURE WHICH ALLOWS FOR THE THERMAL VARIATION IN LENGTH OF CONNECTING PIPE LINES
Wilhelmus A. Feliks, The Hague, and Henri H. Weevers, Gouda, Netherlands, assignors to European Atomic Energy Community (Euratom), Brussels, Belgium
Filed Aug. 8, 1966, Ser. No. 571,115
Claims priority, application Netherlands, Aug. 17, 1965
6510744
8 Claims. (Cl. 122—510)

ABSTRACT OF THE DISCLOSURE

A processing installation including a processing vessel for receiving and delivering currents of fluid media having a high temperature differential relative to the ambient air. The vessel is mounted on a supporting structure allowing thermal expansion of connecting pipe lines. The support preferably includes ball bearings and the like.

---

The invention relates to an equipment incorporating a processing vessel designed for receiving and delivering currents of medium which show a high difference in temperature in relation to the environment. If currents of medium are supplied to or discharged from the processing vessel in the usual manner by means of pipe lines, the risk arises in practice that the processing vessel and the pipe lines are subjected to thermal expansion forces originating mainly from the pipe lines connected to the processing vessel. As a result of these forces one is usually obliged to fit long pipes having additional bends, which in the first place means extra constructional weight, whilst in addition extra space has to be provided for these bends. In order to avoid these drawbacks while still keeping the thermal stresses within acceptable limits, the processing vessel, which is joined to the foundation by means of a connecting structure, is executed in such a manner according to the invention that this connecting structure permits a swinging movement of the processing vessel.

By swinging movement is meant here not only a movement caused by a set of pole surfaces rolling away over each other, but also the special case in which a rotation occurs either around a point or around an axis. Although this axis of rotation need not of course be fixed, a swinging movement will hereinafter be understood to mean, inter alia, the movement in which an oscillation is performed around a fixed straight axis.

In this embodiment the connecting structure is constructed as at least one bearing structure comprising the processing vessel, in which several bearing elements are confined which can execute a rolling movement in the course of which these bearing elements come into contact with a first roller track on at least one side of their roller axis and are supported on the other side, preferably by a supporting ring executed with a second roller track or executed with journals for the bearing elements.

The effect of this is that not only a light and compact installation can be obtained in which thermal stresses are greatly reduced as a result of the additional degree of liberty of the processing vessel, but also that a construction is formed which, thanks to the confining character of the bearing structure, is able to receive mass acceleration forces in all directions.

It is found that the proposed construction lends itself particularly well for use in ships in which allowance has to be made for the fact that, owing to the rolling movement of the vessel which is produced by the swell of the sea, considerable acceleration forces will be exerted upon a processing vessel of this kind.

Should the invention be applied to a nuclear installation, the shortening of the pipe line which is thus achieved yields a further saving on the radiation screening.

Moreover, by the elimination of expansion bends which have become superfluous in a nuclear installation, the contents of the primary circuit are reduced.

In a preferred embodiment the bearing structure may be executed for instance as a ball or roller bearing or as a bearing provided with conical rollers in such a way that it is assembled from segments that can be taken apart. This is possible because the rotation that is performed in this bearing is exceedingly slight, being only a fraction of the circumference of the bearing. This assembling in segments facilitates the mounting and dismantling of the bulky installation components situated in the vicinity.

Moreover, heat-insulating material is introduced between a connecting sleeve, which connects the bearing structure to the processing vessel, and the processing vessel itself in order to counteract as far as possible the heating of the bearing structure by the heat developed in the processing vessel.

The pipe connections should be executed in such a way that all thermal expansion forces originating from the pipe lines connected to the processing vessel result in a slight rotation of the processing vessel around the center of the permissible swinging movement. In this movement all the rotational impulses act in the same direction, so that the thermal expansions do not counteract each other, which would again cause extra stresses.

The construction proposed will permit of application in numerous fields of technique. The processing vessel may be executed as a steam generator. Especially in machine installations with a steam generator which, as in the case of nuclear installations, demand a very compact construction inside a containment, the invention affords an appreciable saving in space which results in a lighter embodiment and smaller containment.

A number of embodiments of the invention are further elucidated in the description of the drawings which is given below.

FIGURE 1 gives a diagrammatic representation of the top plan view of an application according to the invention.

FIGURE 3 shows a possible position of a support according to the invention in the most general case.

FIGURE 4 represents a vertical, part cross-section of a processing vessel according to the invention.

FIGURE 5 gives a horizontal, part cross-section through V—V in FIGURE 4.

FIGURE 6 shows three constructional embodiments of the bearing assembled in segments.

FIGURE 7 is a variant of a supporting structure.

FIGURE 8 is a further variant.

Figure 1:
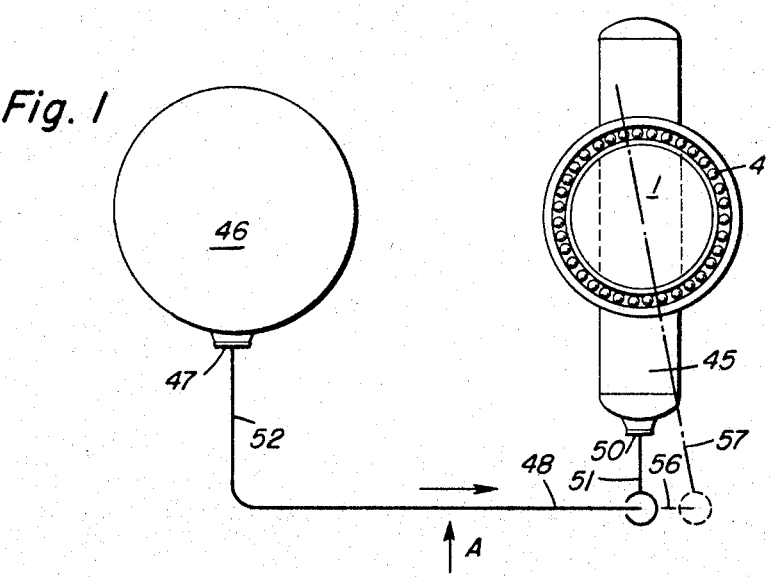

FIGURE 1 gives in outline a top plan view of an embodiment in which the invention is used. In this embodiment item 1 represents the processing vessel which is surrounded by a supporting bearing 4. In the bottom part of the processing vessel 1, which has a fairly vertical center-line, there is a component of the processing vessel which projects vertically to either side in the direction perpendicular to the center-line of the vessel. This component is denoted as 45. Beside the processing vessel there is another installation component 46 which is rigidly fixed to the foundation by means of supporting members 53. The installation component 46 is provided with a connecting flange 47 to which a pipe 52, 48, 49, 51 is connected, which pipe is coupled with a flange 50 of component 45 of the processing vessel. The course of this connecting pipe can be seen not only in horizontal projection in FIGURE 1, but also in vertical projection in FIGURE 2.

FIGURE 1 shows that as a result of the rotational supporting of the processing vessel 1 a thermal expansion of the pipe portion 48 in the direction of the arrow will cause a displacement 56 of the pipe portion 49. As a result of this displacement the center-line of part 45 will move round from position 51 to position 57. This thermal expansion does not therefore result in thermal stresses, as the expansion of pipe 48 can take place without obstruction. Thermal stresses of the second order which may occur as a result of angular variations between pipes 48 and 51, will be absorbed to a sufficient extent, inter alia, by the torsion which pipe 49 may undergo.

As is furthermore made clear in FIGURE 1, the longitudinal variations of the pipe portions 52 and 51 need not differ from each other provided the temperatures $t$ of the installation component 46, the processing vessel 1 and the connection pipes are equally high, that the coefficients of thermal expansion $\lambda$ are the same and that the pipe portion 48 runs parallel to the connecting line of the vertical center-lines of the installation component 46 and the processing vessel 1.

Figure 2:
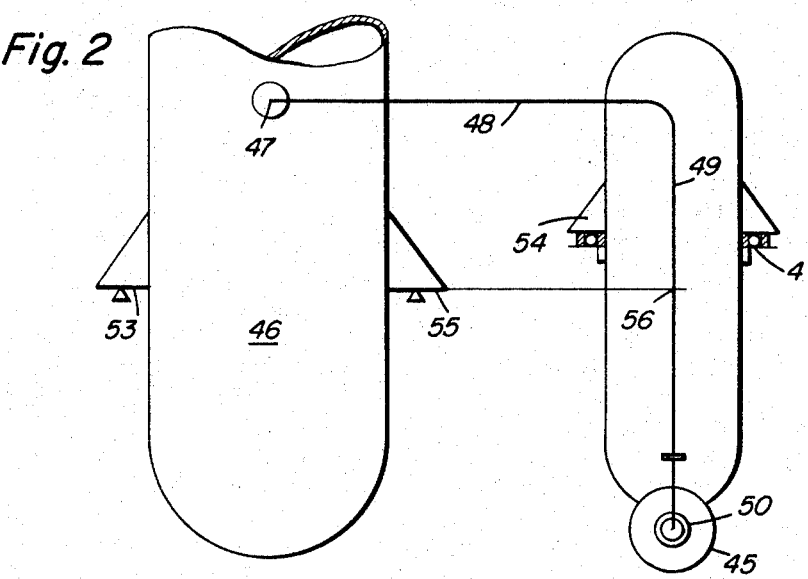
FIGURE 2 is a vertical view taken in the direction of arrow A in FIGURE 1.

FIGURE 2 illustrates how the position of the bearing 4 which supports the processing vessel 1 should be determined. For the sake of simplicity it is again assumed in this figure that the materials used for the installation component 46 and for the pipe portions 52, 48 and 49 are substantially the same. As the variation in length of pipe portion 49 will be just as great as the displacement of point 47 in relation to the support 53, point 56 of pipe 49 will not be displaced in a vertical direction.

If, in the following $-\Delta l_3$ = the thermal expansion downwards from pipe 56–50;

$\Delta l_1$ = the thermal expansion of the part of vessel 1 situated between 50 and 4;

$-\Delta x$ = the thermal expansion downwards from the part of vessel 1 situated between 4 and 56, the following may be formulated for the condition that no thermal stresses may occur:

$$-\Delta l_3 + \Delta l_1 - \Delta x = 0$$

or:

$$\Delta x = \Delta l_1 - \Delta l_3 = \lambda t l_{4/56}$$

In this equation $l_{4/56}$ is the vertical distance between the supporting bearing 4 and point 56.

From this relation the position at which bearing 4 must be fitted can therefore be determined according to:

$$l_{4/56} = \frac{\Delta l_1 - \Delta l_3}{\lambda t}$$

FIGURE 3 shows that the bearing 4 which supports the processing vessel 1 need not necessarily have the same center-line as the processing vessel. Between these center-lines there may be an angle $\alpha$, at any rate in the general case. It is conceivable that owing to the connecting pipes (not shown in FIGURE 3) this vessel will undergo a displacement, i.e. a rotational shift, in the hot condition as compared with the cold condition. It is of course always possible to pass from the cold initial condition to the hot final condition by a certain rotational shift. This may be formulated by saying that each pipe connection introduces a rotational vector as a result of the thermal expansion of this pipe. All these rotational vectors when added together will ultimately yield a joint resultant rotational vector of the processing vessel 1. As a rule it will be possible to minimize thermal stresses by making the center-line of the supporting bearing coincide with the direction of the resultant rotational vector.

In FIGURE 4, item 1 shows a processing vessel provided with a connecting sleeve 2 which is connected with the processing vessel at the position of item 3. At the end of sleeve 2 there is a ball bearing 4 whose outer ring 5 is connected with a supporting ring 6. This supporting ring 6 is rigidly connected by means of fixing elements 7 with the foundation, of which item 8 represents a supporting beam. In the example shown, the bottom part 9 of the processing vessel has a compartment 10 to which two pipe lines 11 and 12 are fitted.

FIGURE 5 shows that pipe lines 13 and 14 are connected to the last mentioned pipe connections. Pipe 14 in this figure is connected at the other end to a connecting stump 15 of a further installation component 16. The center-lines 17 and 18 which join up the connecting passages of the processing vessel and other installation components run in directions tangential to two circles 19 and 20, both drawn from the same center 21, in such a way that the thermal expansions along the center-lines 17 and 18 produce a rotation in the same direction of the processing vessel 1 around the vertical axis through 21.

In FIGURE 6, a number of typical embodiments are given of bearing 4. This bearing, which is assembled from six segments 22, 23, 24, 25, can be executed in different ways. As segment 22 shows, the bearing elements 26 have the form of balls or rollers. It is, however, also possible to use bearing elements 27 which have the required spherical or cylindrical outer jacket over only a part of their outer surface. In extreme cases the radius of curvature of the surface portions of the bearing elements which are intended to roll away between the circumferentially positioned outer and inner boundaries of the bearing, may be so small that a bearing element 28 is formed which is executed with a knife-edge fitted on at least one side, which knife-edges may have a very small radius of curvature. As the bearing described need only perform a very slight rotation, it is not absolutely necessary to have the total circumference of the bearing occupied by bearing elements 26, 27 or 28. It will suffice if this is the case, for instance, at three positions on the circumference. The remainder of the circumference of the bearing structure may therefore be filled up with segments 25 which are not intended to receive bearing elements but which have the sole function of connecting the elements 22, 23 and 24.

FIGURE 7 shows a variant in which the sleeve 2 of the processing vessel 1 (not shown in the drawing), whose axis of rotation is here again 21, provided with a rim 41 resting on a roller construction 42 which in turn, via a ball bearing and roller bearing construction 43, is connected with a pin 44. This pin is fixed in the supporting ring 6.

In FIGURE 8 a further variant is described in which the above-mentioned roller 42 is not fixed to the supporting ring 6 but, on the contrary, to the rim 41 of the processing vessel 1.

In the two variants last described it will suffice for good supporting of the processing vessel if rollers 42 of this kind are fitted to at least three points of the circumference.

What we claim is:

1. A processing installation for media having a large difference in temperature in relation to the environment comprising, in combination, a processing vessel having at least one connecting passage for receiving and delivering fluid currents, foundation means supporting said vessel, mounting means interposed between said processing vessel and said foundation means, at least one other vessel component of the installation having at least one flow connecting passage, at least one pipeline means having one end rigidly coupled to said connecting passage of said other vessel component and the other end rigidly connected to said connecting passage of said processing vessel, said pipeline defining a flow path for said fluid currents, said mounting means comprising at least one bearing means, said bearing means producing supporting forces in all spatial directions, said bearing means comprising a rotating part embracing said processing vessel and a stationary part fixed to said foundation means, said bearing means allowing oscillation of said processing vessel around its axis of rotation, a number of bearing elements being confined in said bearing means between said rotating and said stationary parts for rolling movement, whereby thermal expansion and contraction of said pipe line is converted into rotation of said processing vessel around its said axis of rotation.

2. A process installation according to claim 1 in which first and second roller tracks are formed on facing surfaces of said rotating and stationary parts, respectively, of said bearing means, said bearing elements having opposite sides thereof in contact with said tracks.

3. A process installation according to claim 1, wherein the axis of rotation of the processing vessel is stationary, a plurality of supporting journals each having one of said bearing elements revolving thereon.

4. A process installation according to claim 1, wherein said bearing means comprises circumferential segments adapted to be assembled and disassembled the radial direction.

5. A process installation according to claim 1, in which a straight line forming a geometrical junction between the ends of every pipeline is substantially tangential to a circle described from a center point on said stationary axis of rotation.

6. A process installation according to claim 5, having a plurality of pipelines, wherein said straight line between the ends of each pipeline is directed so that couples caused by the thermal variations in length of each of the pipe lines during operation are at all times in the same direction.

7. A process installation according to claim 1, wherein said rotating part of the bearing means is fixed to said processing vessel by means of a connecting sleeve fitted around the processing vessel.

8. A process installation according to claim 7, wherein heat insulating material is placed between the outer wall of said processing vessel and said connecting sleeve.

References Cited

UNITED STATES PATENTS

| | | | |
|---|---|---|---|
| 1,634,084 | 6/1927 | Ruths | 122—510 |
| 3,192,121 | 6/1965 | Challender et al. | 122—510 X |

KENNETH W. SPRAGUE, *Primary Examiner.*